April 7, 1953 C. N. HICKMAN 2,633,702
MULTIPLE NOZZLE ROCKET
Filed Feb. 28, 1946 2 SHEETS—SHEET 1
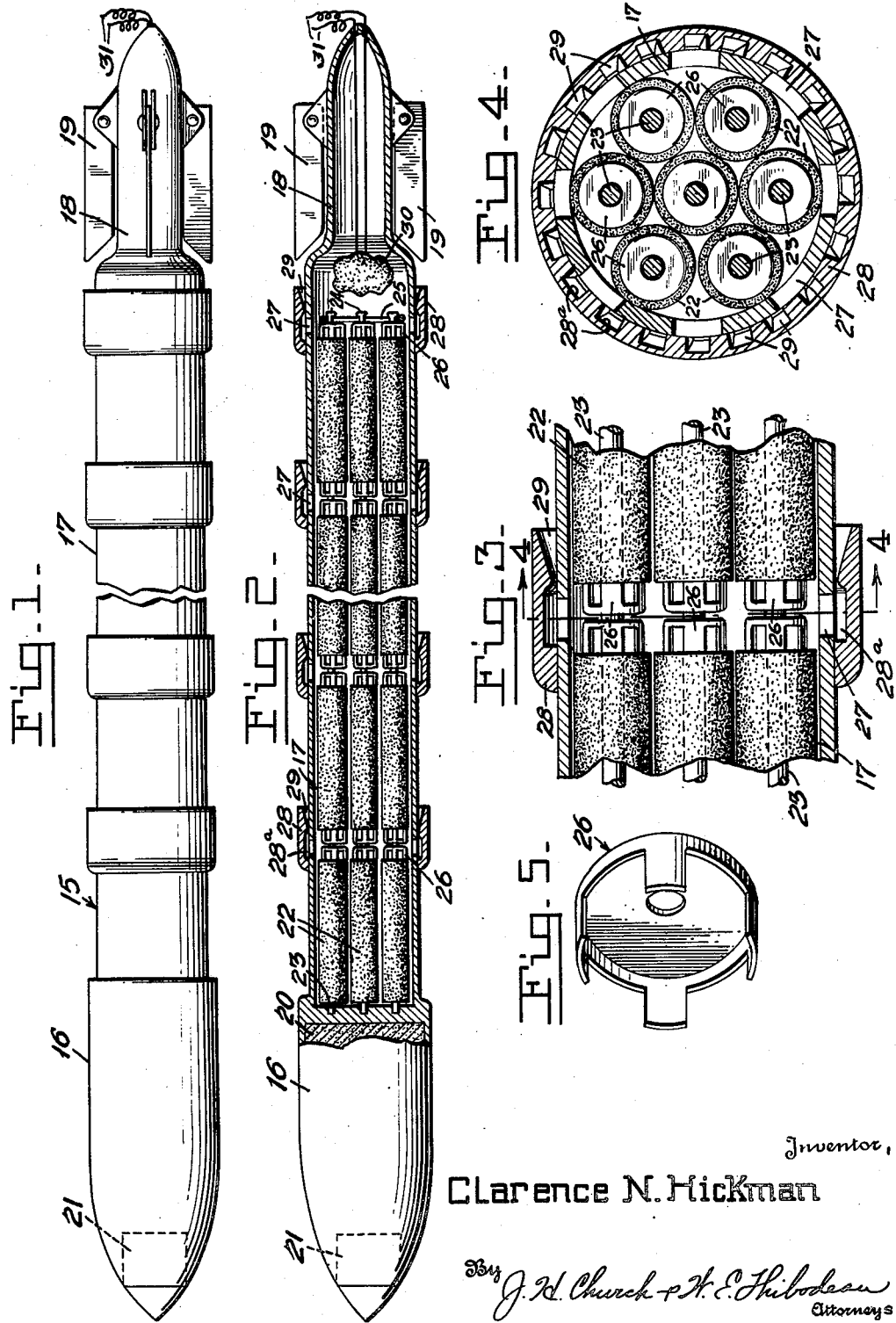
Inventor,
Clarence N. Hickman
By J. K. Church & W. E. Thibodeau
Attorneys April 7, 1953
C. N. HICKMAN
2,633,702
MULTIPLE NOZZLE ROCKET
Filed Feb. 28, 1946
2 SHEETS—SHEET 2
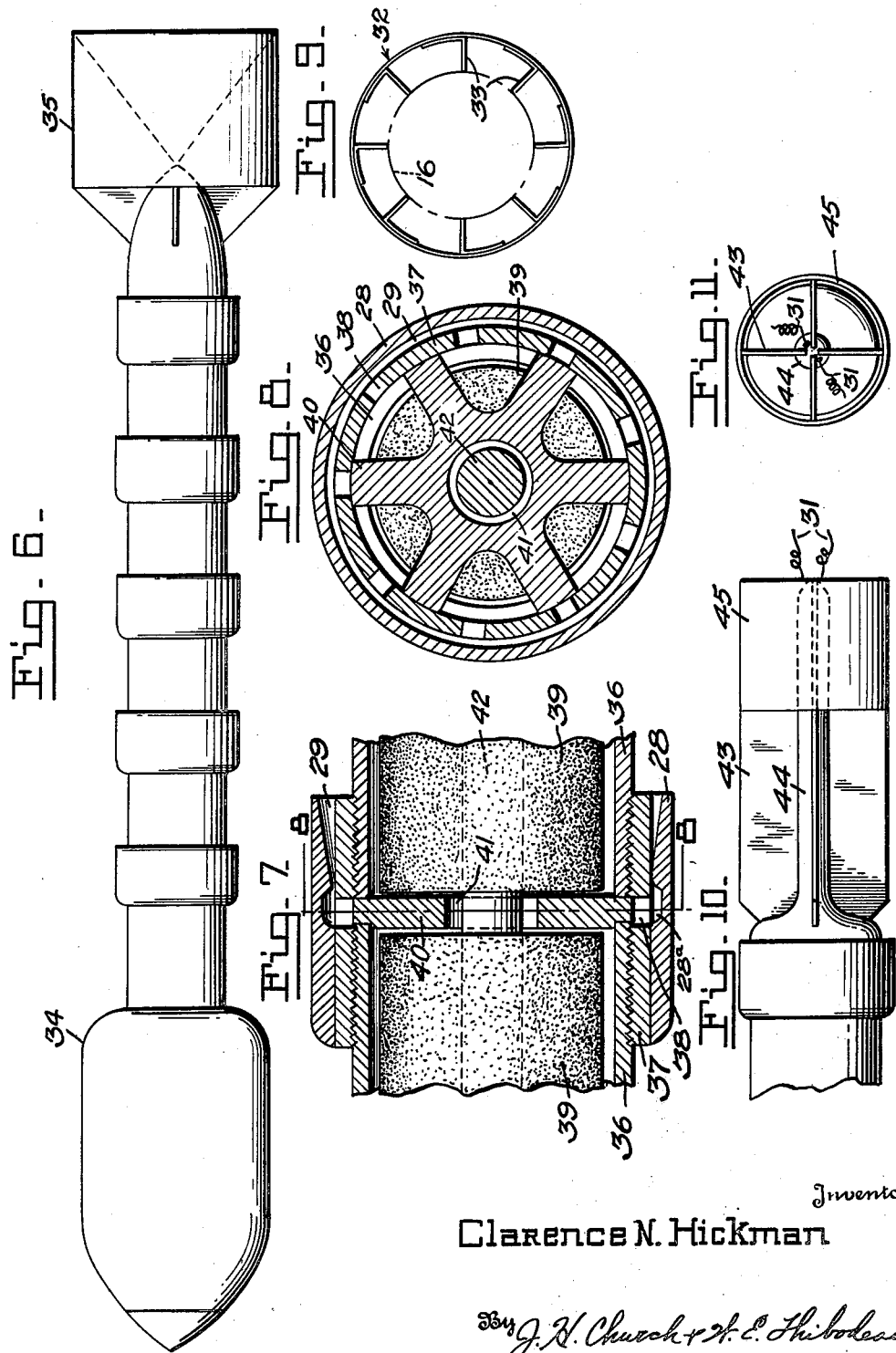
Inventor
Clarence N. Hickman
By J. H. Church + H. E. Thibodeau
Attorneys Patented Apr. 7, 1953

2,633,702

UNITED STATES PATENT OFFICE 2,633,702

MULTIPLE NOZZLE ROCKET

Clarence N. Hickman, Jackson Heights, N. Y., assignor to the United States of America as represented by the Executive Secretary of the Office of Scientific Research and Development Application February 28, 1946, Serial No. 650,931

17 Claims. (Cl. 60—35.6)

(Granted under Title 35, U. S. Code (1952), sec. 266)

The invention described herein may be manufactured and used by or for the Government for governmental purposes, without the payment to me of any royalty thereon.

This invention relates to rockets and more particularly to a new and improved rocket motor having a plurality of jets spaced along the rocket chamber to permit the attainment of a high terminal velocity with a thin web propellant.

A rocket motor of the prior art, in broad aspect, consists of a cylindrical motor chamber containing a propellent composition supported therein which upon ignition and burning liberates a gaseous combustion product. These gaseous combustion products are discharged at a relatively high velocity through a nozzle located preferably at the rear of the combustion chamber to propel the rocket forwardly toward the object at which it is aimed. The propellant utilized may comprise a plurality of cylindrical grains supported within the rocket chamber by trap rods which extend longitudinally thereof, or the propellant may take the form of a single cylindrical grain supported within the chamber and spaced from its walls by ridges or tabs formed on or secured to the grain. This single grain is generally retained within the chamber by a grid-like trap, which is positioned between the end of the cylindrical grain and the nozzle constriction. For attaining a high velocity, and at the same time maintaining a short total burning time, I have preferred to utilize the multi-grain propellant. These propellent grains of small web are formed by the solvent extrusion of double-base powder made by gelatinizing and colloiding mixtures of nitrocellulose and nitroglycerin. Each of these grains in my preferred construction have been provided with a single cylindrical and concentric perforation. This permits burning on the inner and outer cylindrical surface to maintain a substantially constant burning area of propellant, and further permits the grains to be trapped within the motor chamber by being strung on trap rods extending longitudinally thereof.

In the rockets of the prior art where the burning of the propellant takes place upon all the exposed surfaces, the maximum density of loading of the propellant depends upon the length of the rocket chamber. This is particularly true where multiple thin web sticks of propellant are used. Since in this latter case the density of loading is also limited by the fact that the burning surfaces are greatly increased with the length of the rocket chamber, the mass rate of formation of the powder gases which is proportional to the burning surface increases much more rapidly with the chamber length. That the density of loading is dependent upon the length of the rocket chamber in these prior rocket motors will be made more apparent when one considers that the products of combustion are evolved at substantially equal rates from the propellant all along the chamber. That is, the rate of formation of the combustion products from the propellant in the forward portion of the rocket chamber and from the propellant in the rearward portion thereof are substantially equal. These combustion products must, however, be discharged through an orifice located at the rear of the chamber. Consequently, all the powder gases evolved must pass down the channel between the grains, and between the grains and the inner chamber walls. A greater quantity of gas must pass through this channel at the rear of the chamber than passes through the channel at the forward end of the chamber. Thus, when the rocket motor chamber is long, the powder charge is increased resulting in a further increase in the mass rate of formation of the combustion products and resulting also in an increase in the quantity of gas which must pass the section near the nozzle. Consequently, more port area must be provided for these gases at the rear end of the charge. Even if a single powder grain were used, it would be necessary to reduce the diameter of the grain at the end adjacent the exit orifice in order to provide an increase in the port area as the rocket is made longer. The increase in powder charge cannot remain, therefore, proportional to the increase in the length of the rocket motor chamber.

The necessity for sufficient free-port area as a factor in rocket design has been recognized for some time. In my own experiments, I have tapered the powder charge for a free-port area in the direction of gas flow, thus permitting a greater quantity of propellant to be used. I have also discovered that the front end of the rocket motor chamber may have a smaller port area and that a relatively high density of loading may be used, in a design in which the number of powder grains appearing at a cross-section are reduced as the length of the motor is increased to provide the extra port area that is needed for the passage rearwardly of the increased quantities of gas liberated by the added propellant. This method of loading permits the use of a charge appreciably larger than that which could be used without resorting to this expedient, and in those rockets which utilize a central burster tube tapering of the burster tube provides an exceedingly suitable method for obtaining the increase in free-port area.

I have now discovered a method whereby a rocket motor chamber may be loaded with a propellant so that the density of loading all along the motor chamber may be as great as the density of loading in the forward portion of the motor chamber where a tapered charge had been used formerly. Rather than provide an increase in the port area to accommodate the increase in the combustion products liberated by the increased length of the propellant, I maintain a uniform density of loading by providing a series of exit jets for these combustion products along the rocket motor chamber. In other words, I have accomplished the objects of my invention by utilizing a plurality of nozzles disposed along the chamber. The importance of this discovery resides in the fact that I am now able to obtain a high velocity rocket with a thin web propellant which has a markedly short burning time.

In the accompanying drawings, forming part of this specification, and in which like numerals are employed to designate like parts throughout the same, I have illustrated certain embodiments of my invention with the understanding, however, that these embodiments are set forth for the purpose of illustration only and that changes in the construction of parts may be necessary in the manufacture of the finished rocket.

In the drawings:

Figure 1 is a side elevation of a rocket,

Figure 2 is a partial longitudinal section of the same, illustrating a preferred embodiment of the invention, Figure 3 is an enlarged view in longitudinal section of a portion of the rocket motor shown in Figure 2, Figure 4 is a transverse section taken on the line 4—4 of Figure 3, Figure 5 is a perspective view of the trap washer for the propellant, Figure 6 is an elevation of a modification of Figure 1, Figure 7 is a fragmentary longitudinal section of the rocket of this invention adapted for single propellant grains, Figure 8 is a transverse section taken on the line 8—8 of Figure 7, Figure 9 is a front elevation looking to the rear of a projector or launcher tube for the type of rocket shown in Figure 1, Figure 10 is a side elevation of a modified stream-line tail for the rocket shown in Figure 1, and, Figure 11 is a rear elevation of the modified tail shown in Figure 10.

Referring now to the drawings, the numeral 15 designates a rocket, comprising a head 16, a cylindrical combustion chamber 17, and a tail 18 upon which are mounted the folding fins 19 for stabilizing the rocket in free flight. The high explosive bursting charge 20 and a fuze 21 are contained within the head 16.

The propellant charge within the combustion chamber 17 consists of the cylindrical powder grains 22 which are packed to substantially fill the said combustion chamber. As shown in the preferred embodiment, these grains are ⅞ inch in outer diameter and have a ¼ inch cylindrical and concentric perforation extending longitudinally thereof. Each of the grains is 5⅛ inches long, and the said grains are strung on a plurality of trap rods or wires 23, having beaded heads 24 for suspending said trap rods 23 from a trap ring 25 positioned within the combustion chamber 17 at the end of said chamber adjacent the tail. The opposite ends of the said rods 23 are secured to the base of the head portion of the rocket. The powder grains 22 are spaced apart from each other on the wires 23 by trap space washers 26 placed back to back between the powder grains 22.

Opposite the trap washers 26, the cylindrical combustion chamber 17 is provided with a plurality of radially drilled openings 27. Disposed concentrically about the combustion chamber 17 so as to overlie these openings is the ring 28 which has a plurality of ports 29 provided therein. In construction, I prefer to have the ring 28 silver-soldered to the motor chamber, and the ports 29 which are formed in the said ring may be broached in at an angle so that the discharge of the gaseous combustion products through these ports will produce rotation of the rocket. The combustion products liberated by the burning propellant enter a grooved recess 28a in the ring 28 through the openings 27 formed in the combustion chamber and are discharged rearwardly through the ports 29 which communicate with the said recess 28a.

The igniter 30 for the propellant 22 is shown placed at the rear of the motor with the electrical ignition leads 31 extending out through the tail of the rocket.

Since rockets are fired from individual projector tubes, in Figure 9 I have illustrated in cross-section a type of projector or launcher tube 32, having inner spacer rails 33, suitable for projecting the type of rocket disclosed in Figure 2. The spacer rails 33 must be provided to permit the gases which are liberated from the ports 29 formed along the combustion chamber 17 to discharge rearwardly through the projector tube 32.

In Figure 6 I have shown a modified type of rocket motor wherein a large head 34 and a large ring tail fin 35 are utilized. In all other respects, the motor would be constructed and function as heretofore disclosed. This type of rocket could obviously be fired from a standard smooth bore projector tube.

If desired, the combustion chamber 17 may be cut into a number of cylindrical sections 36 as shown in Figure 7, and these sections could be assembled to a ring 37 by being threaded thereon as shown in Figure 7. In this instance the ring 37 is provided with a plurality of radially drilled openings 38 and the gas ring 28, as heretofore described, is silver soldered to the ring 37.

When a single powder grain 39 is used as a propellant, a trap 40, as shown in Figure 8, may be utilized to hold the grains in place. The trap 40 consists of a six-spoked member which is assembled between the cylindrical section 36, as shown in Figure 7, and is provided with central opening 41 to allow passage of a rod 42 upon which the powder grains are strung. The advantage of this construction results from the fact that the length of grain is shortened thus reducing the accelerating forces acting on the end of the grain, and reducing, also, the compression forces encountered in prior art types of rocket motors employing a single grain.

Figures 10 and 11 illustrate a modified streamline type of tail assembly for the rocket shown in Figure 1, in which the fins 43 are made integral with the tail section 44 and are held in their fixed positions by a metal band 45 about their rearward extremities.

I will now give some figures that will show the gain in density of loading for a particular rocket design. Let us assume that seven rows of powder sticks will be employed throughout the length of the motor. If these sticks have dimensions ⅞x¼x5⅓ inches (the powder now being used in the 4½ inch rocket) the surface area of one group of seven sticks is 121 square inches. Experience has shown that the port area should be at least 1/100 of the powder surface. If we assume that the powder sticks vary in diameter and that .90 of an inch is the largest stick that would be encountered we would need a chamber having an internal diameter of 2.7 inches. The cross-sectional area of this chamber is 5.7 square inches. The cross-sectional area of the seven sticks is 3.9 square inches. This leaves 1.8 square inches for the port area. This is appreciably more than the required 1/100 of 121 square inches of surface. If the internal diameter of the chamber is 2.7 inches we may make the outside diameter 3 inches. This would give a wall thickness of .150 inch. If we used half inch holes through the chamber wall as outlets into the ring we will have an outlet port of 1.8 square inches for 9 such holes. Spacing the 9 holes equidistant around the circumference will leave sufficient strength to prevent the motor from parting due to axial tension. Due to the silver-soldered ring a still further factor of safety is obtained. For a K value (in the burning equation) of 210 the nozzle port should have an area of .58 square inch to take care of all of the surface of seven sticks. If the nozzle ports have a width of ¼ inch and a depth of .11 inch we may obtain sufficient throat area by having 20 of these nozzle ports. They may be tapered from .11 to .22 giving a nozzle expansion ratio of 2. If the rings are ¼ inch in thickness this will leave a wall having a thickness of .030 of an inch at the exit.

Since the weight of a stick is about .16 pound, seven sticks will weigh 1.12 pounds. If we were to design a rocket having eight sections the total weight of the charge would be nine pounds. The chamber would have a length of 41 inches. A comparison between this motor and one in which all the gases emerge at the rear may readily be obtained by noting that the port area for eight groups of seven sticks would have to be at least 7.68 square inches. The cross-sectional area of the seven sticks is 3.94 square inches. Adding this to the port area of 7.68 gives 11.62 square inches. The internal diameter of a motor having this area is 3.84 inches. This is in contrast to the 3-inch motor specified in the description.

The enormous gain in powder charge for a given motor may be better shown by assuming that we have a motor which is 41 inches long but has a nozzle at the rear end. If we let X equal the total number of sticks that may be placed in the motor, and since the surface of one stick is 17.3 inches, the port area must equal .173X. The area of the chamber is 5.7 square inches, the cross-sectional area of each stick .55 square inch. Then the port area must equal $$5.7 - \frac{.55X}{8}$$

Equating these two values we find that X is equal to approximately 24. In other words, we could only use 24 sticks of powder with the orthodox motor design, whereas 56 sticks may be used with the multiple nozzle design. By using the tapered nozzle principle, it would be possible to increase the 24 sticks to approximately 40. This, however, is still far short of the 56. Furthermore, it would not be practical to trap the sticks in such a long motor. In the multiple nozzle design there are no forces on the stick other than that due to acceleration. Means may be found for trapping the sticks so that only single sticks, or at most a few, have to be accelerated by the trap wire. If the system shown in Figures 7 and 8 is used, trapping and accelerating of the powder presents no serious problem.

It is believed that this design opens up new possibilities for obtaining much higher velocities with the thin web powders and may solve some of the trapping problems encountered with the thick web powders and the weaker types of powder obtained by the solventless process. Such a design might be ideal for using the alternate propellant.

Having thus described my invention I claim:

1. A rocket motor having a cylindrical combustion chamber provided with a plurality of spaced openings lying in a plane perpendicular to the axis of said cylindrical combustion chamber in its walls, a propellant within the said chamber consisting of a plurality of powder grains each of said grains being provided with a single cylindrical and concentric perforation, means including at least one trap rod mounted in said chamber for supporting the said powder grains within the said chamber axially parallel with the axis of the chamber and away from the walls of the said chamber, mechanical separating means supported by said first-mentioned means between the oppositely adjacent ends of the separate powder grains to hold the ends of the said powder grains positioned on the supporting means a predetermined distance from each other at points substantially coinciding with the openings in the chamber walls, and nozzle means including a circumferential collar provided with an annular grooved recess about its inner surface and a number of ports communicating with said grooves disposed concentrically about the said combustion chamber so as to overlie the openings in the said chamber walls, said mechanical separating means being of a width at least equal to said spaced openings in the direction of the axis of said cylindrical combustion chamber whereby the gases liberated by the burning propellant enter the grooved recess through the openings formed in the combustion chamber walls and are discharged through the ports which communicate with the recess.

2. A rocket motor having a cylindrical combustion chamber formed of a number of cylindrical sections, a ring member provided with a plurality of radially drilled openings and arranged with screw-threaded means for externally connecting adjacent cylindrical sections to form the said combustion chamber, a plurality of single grain propellent charges of slightly smaller diameter than the inner diameter of the combustion chamber, means for suspending said powder grains within the said combustion chamber, a spoked trap member assembled within the chamber and between the cylindrical sections of the said chamber to hold the said powder grains in place and provide an annular opening between the said sections, a circumferential collar provided with an annular groove about its inner surface and a number of ports communicating with the said grooved recess disposed concentrically about the said ring member so as to overlie the radially drilled openings in the said ring member whereby the gases liberated by the burning propellant enter the grooved recess through the annular opening between the cylindrical sections of the combustion chamber and the drilled openings in the said ring member and are discharged through the ports which communicate with the recess.

3. In a rocket motor, a generally cylindrical casing having a central longitudinal axis, there being a plurality of series of holes through the wall of said casing, each said series of holes lying substantially in a respective plane, all said planes being normal to and spaced axially along said longitudinal axis, a trap rod fixed in said casing and extending therethrough parallel with said axis, a plurality of axially apertured propellent grains strung on said rod in end-to-end relation, a plurality of trap discs strung on said rod in said perspective planes, there being a disc between and spacing each successive two grains, and means fixing each disc to said casing at points lying in said respective plane.

4. In a rocket motor as recited in claim 3, and means secured to said casing externally thereof and surrounding each said series of holes to form a plurality of rearwardly-directed jets from the products of combustion of said grains.

5. In a rocket motor, a plurality of tubular sections of equal diameter, a plurality of sleeves, each sleeve having a series of radial, circumferentially-spaced holes in a plane between the ends thereof, a plurality of generally star-shaped washers having a maximum diameter substantially equal to the external diameter of said tubular sections, means securing confronting ends of successive tubular sections in a respective sleeve with a respective washer therebetween and spacing said confronting ends, each said washer lying in the plane determined by the holes of a respective sleeve, whereby each two successive washers and the sleeve therebetween form a compartment connected with the atmosphere through at least some of said holes.

6. A rocket motor as recited in claim 5, each said washer having an aperture, all said apertures being axially aligned, a trap rod passing through said aligned apertures, and a grain of propellant in each compartment strung on said trap rod.

7. A rocket motor as recited in claim 6, and means fixed to each said sleeve externally thereof, to form rearwardly-directed jets from gas passing radially outwardly through said holes.

8. In a rocket motor, first means defining a combustion chamber having a longitudinal axis, at least one trap rod mounted in said chamber in substantially parallel relationship with said axis, a plurality of propellent grains supported by said trap rod, spacing means supported by said trap rod intermediate adjacent ends of said propellent grains for spacing the same a predetermined distance from each other, aperture means in said first means lying in a plane perpendicular to said axis at a point substantially coinciding with said spacing means, and nozzle means in operative relationship with said aperture means, said spacing means being of at least equal width as said aperture means.

9. A high velocity rocket for use with propellants having markedly short burning time comprising first means forming a combustion chamber of relatively increased length having a longitudinal axis, at least one trap rod mounted in said chamber in substantially parallel relationship with said axis, a plurality of propellent grains supported by said trap rod, spacing means supported by said trap rod intermediate adjacent ends of said propellent grains for separating each pair thereof a predetermined distance along said axis, nozzle means affixed to the outer surface of said first means, and aperture means operatively connecting said nozzle means with said combustion chamber, said aperture means being located in a plane substantially coincident with the plane of said spacing means, said spacing means being at least of equal dimension in the direction of said axis as said aperture means.

10. In a rocket motor for use with propellants having a markedly short burning time, first means defining a cylindrical combustion chamber, at least one trap rod mounted in said chamber in substantially parallel relationship with the axis of said cylindrical chamber, a plurality of propellent grains having substantially concentric perforations to thereby support said propellent grains, spacing means having a concentric opening to receive said trap rod, said spacing means lying in a plane substantially perpendicular to said axis and being supported by said trap rod intermediate adjacent ends of each pair of said propellent grains to separate the same a predetermined distance along said axis, nozzle means affixed to the outer surface of said first means, and circumferential aperture means operatively connecting said nozzle means to said combustion chamber, said aperture means lying in a plane substantially coinciding with the plane of said spacing means, said spacing means having a thickness at least equal to the dimension of said aperture means in the direction of said axis.

11. In a rocket motor for use with propellants having a markedly short burning time, first means defining a cylindrical combustion chamber, at least one trap rod mounted in said chamber in substantially parallel relationship with the axis of said cylindrical chamber, a plurality of propellent grains having substantially concentric perforations, said trap rod passing through said concentric perforations to thereby support said propellent grains, spacing means having a concentric opening to receive said trap rod, said spacing means lying in a plane substantially perpendicular to said axis and being supported by said trap rod intermediate adjacent ends of each pair of said propellent grains to separate the same a predetermined distance along said axis, nozzle means affixed to the outer surface of said first means, and circumferential aperture means operatively connecting said nozzle means to said combustion chamber, said aperture means lying in a plane substantially coinciding with the plane of said spacing means, said spacing means being of smaller cross sectional area than said combustion chamber and of at least equal width as said aperture means in the direction of said axis.

12. In a rocket motor, first means defining a combustion chamber having a longitudinal axis, at least one trap rod mounted in said chamber in substantially parallel relationship with said axis, a plurality of propellent grains supported by said trap rod, a plurality of spacers suported by said trap rod intermediate adjacent ends of said propellent grains for separating the same a predetermined distance from each other, a plurality of communicating passages in said first means lying in a plane perpendicular to said axis at points substantially coinciding with said spacers, and a plurality of nozzles in operative relationship with said communicating passages, said spacers being of at least equal dimension as said communicating passages in the direction of said axis.

13. The apparatus according to claim 12 wherein said first means consists of a plurality of discrete sections and of further means engaging each pair of said sections for retaining said sections in their assembled positions.

14. The apparatus according to claim 12 wherein the number of trap rods in said combustion chamber exceeds one.

15. In a rocket motor for use with propellants having a markedly short burning time, first means defining a cylindrical combustion chamber, at least one trap rod mounted in said chamber in substantially parallel relationship with said axis, a plurality of propellant grains having substantially concentric perforations, said trap rod passing through said concentric perforations to thereby support said propellant grains, a plurality of spacers lying in a plane substantially perpendicular to said axis and being supported by said trap rod intermediate adjacent ends of each pair of said propellant grains to separate the same a predetermined distance along said axis, a plurality of nozzles affixed to the outer surface of said first means, and a plurality of circumferential, communicating passages operatively connecting said nozzles to said combustion chamber, said communicating passages lying in a plane substantially coinciding with the plane of said spacers, said spacers being of smaller cross sectional area than said combustion chamber and of at least equal, effective width as said communicating passages in the direction of said axis.

16. The apparatus according to claim 15 wherein the number of trap rods in said combustion chamber exceeds one.

17. The apparatus according to claim 15 wherein said first means consists of a plurality of discrete, cylindrical sections and of a plurality of rings, one of said rings each engaging a pair of adjacent end portions of said sections for retaining said sections in their assembled positions.

CLARENCE N. HICKMAN.

REFERENCES CITED

The following references are of record in the file of this patent:

UNITED STATES PATENTS

| Number | Name | Date |
| --- | --- | --- |
| 785,644 | Unge | Mar. 21, 1905 |
| 2,206,809 | Denoix | July 2, 1940 |
| 2,398,927 | Farr | Apr. 23, 1946 |
| 2,406,560 | Pope | Aug. 27, 1946 |
| 2,421,552 | Eksergian | June 3, 1947 |
| 2,422,720 | Eksergian | June 24, 1947 |
| 2,434,652 | Hickman | Jan. 20, 1948 |

FOREIGN PATENTS

| Number | Country | Date |
| --- | --- | --- |
| 2,497 | Great Britain | Nov. 8, 1858 |
| 832,464 | France | July 4, 1938 |